(12) United States Patent
Takimoto et al.

(10) Patent No.: US 12,526,503 B2
(45) Date of Patent: Jan. 13, 2026

(54) OPTICAL-ELEMENT DRIVING DEVICE, CAMERA MODULE, AND CAMERA-MOUNTED DEVICE

(71) Applicants: Yukihiro Takimoto, Tokyo (JP); Masahiko Aranai, Tokyo (JP)

(72) Inventors: Yukihiro Takimoto, Tokyo (JP); Masahiko Aranai, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 94 days.

(21) Appl. No.: 18/424,946

(22) Filed: Jan. 29, 2024

(65) Prior Publication Data

US 2024/0259684 A1    Aug. 1, 2024

(30) Foreign Application Priority Data

Jan. 31, 2023    (JP) .................................. 2023-013370

(51) Int. Cl.
*H04N 23/55* (2023.01)
*G03B 3/10* (2021.01)
*G03B 30/00* (2021.01)
*H04N 23/54* (2023.01)
*H04N 23/57* (2023.01)
*H04N 23/68* (2023.01)

(52) U.S. Cl.
CPC ............... *H04N 23/55* (2023.01); *G03B 3/10* (2013.01); *G03B 30/00* (2021.01); *H04N 23/54* (2023.01); *H04N 23/57* (2023.01); *H04N 23/687* (2023.01)

(58) Field of Classification Search
None
See application file for complete search history.

(56) References Cited

U.S. PATENT DOCUMENTS

| | | | |
|---|---|---|---|
| 2015/0212291 A1* | 7/2015 | Lee ...................... | H04N 23/687 348/360 |
| 2018/0338069 A1* | 11/2018 | Hu ........................ | H04N 23/55 |
| 2020/0166770 A1* | 5/2020 | Lee ........................ | G03B 30/00 |
| 2021/0405321 A1* | 12/2021 | Kwon .................... | G03B 30/00 |
| 2023/0341650 A1* | 10/2023 | Park ....................... | G03B 30/00 |

FOREIGN PATENT DOCUMENTS

| | | | | |
|---|---|---|---|---|
| CN | 112987227 A | * | 6/2021 | ............. H04N 23/57 |
| JP | 2006-220775 A | | 8/2006 | |
| JP | 2016-180836 A | | 10/2016 | |
| KR | 20160098159 A | * | 8/2016 | ............... G03B 3/10 |
| KR | 20200020759 A | * | 2/2020 | ............. H02K 33/18 |

* cited by examiner

*Primary Examiner* — Paul M Berardesca
(74) *Attorney, Agent, or Firm* — Shih IP Law Group, PLLC.

(57) ABSTRACT

An optical-element driving device that moves a movable part capable of holding an optical element, with respect to a fixing part in an optical-axis direction, the optical-element driving device including: a rotation restricting part that restricts rotation of the movable part in a circumferential direction by contacting recessed and protruding parts with each other, the recessed and protruding parts being disposed on the movable part and the fixing part; and a damper material provided to the rotation restricting part so as to make contact with the movable part and the fixing part.

5 Claims, 11 Drawing Sheets

OPTICAL-ELEMENT DRIVING DEVICE, CAMERA MODULE, AND CAMERA-MOUNTED DEVICE

CROSS REFERENCE TO RELATED APPLICATIONS

This application is entitled to or claims the benefit of Japanese Patent Application No. 2023-013370, filed on Jan. 31, 2023, the disclosure of which including the specification, drawings and abstract is incorporated herein by reference in its entirety.

TECHNICAL FIELD

The present invention relates to an optical-element driving device, a camera module, and a camera-mounted device.

BACKGROUND ART

In general, a small-sized camera module is mounted in mobile terminals, such as smartphones. In such a camera module, an optical-element driving device that drives an optical element is used.

The optical-element driving device includes an autofocus function (hereinafter referred to as "Auto Focus (AF) function") and a shake-correcting function (hereinafter referred to as "Optical Image Stabilization (OIS) function"). The optical-element driving device automatically performs focusing by the AF function during capturing an image of a subject, and reduces irregularities of an image by the OIS function by optically correcting shake (vibration) caused during capturing of the image.

For example, Patent Literature (hereinafter, referred to as "PTL") 1 describes an optical-element driving device having an AF function and an OIS function. The optical-element driving device described in PTL 1 includes: a lens holder capable of holding a lens; a first driving part having a coil and magnets and moving the lens holder in a direction of an optical axis (optical-axis direction); and a second driving part moving the lens holder in a direction intersecting with the optical axis (optical-axis-orthogonal direction).

In such an optical-element driving device, a configuration is widely known in which an AF movable part (lens holder in PTL 1) is supported by an elastic member such as a leaf spring so as to be movable in the optical-axis direction with respect to an AF fixing part (moving base in PTL 1) surrounding the outer periphery of the AF movable part. In this configuration, the AF fixing part is provided with a recessed portion, the AF movable part is provided with a protruding portion that protrudes so as to be inserted into the recessed portion, and contacting the AF fixing part (recessed portion) and the AF movable part (protruding portion) with each other may restrict the rotation of the AF movable part around the optical axis.

CITATION LIST

Patent Literature

PTL 1
Japanese Patent Application Laid-Open No. 2016-180836

SUMMARY OF INVENTION

Technical Problem

However, in a case where the conventional optical-element driving device employs the configuration where the AF fixing part and the AF movable part are made contact with each other to restrict the rotation of the AF movable part as described above, undesirable shaking is possibly caused due to the impact at the time of the contact, and the posture of the AF movable part becomes unstable, which possibly affects the image quality and the like of the captured image. Thus, suppression of the impact at the time of contact is desired. Meanwhile, it is not desired to significantly complicate the device or increase the size of the device to suppress the impact at the time of contact.

An object of the present invention is to provide an optical-element driving device, a camera module, and a camera-mounted device each capable of suppressing an impact caused at the time of restricting the rotation of a movable part without significantly complicating and enlarging the device.

Solution to Problem

One aspect of an optical-element driving device according to the present invention moves a movable part capable of holding an optical element, with respect to a fixing part in an optical-axis direction, the optical-element driving device including:
 a rotation restricting part for restricting rotation of the movable part in a circumferential direction by bringing recessed and protruding parts into contact with each other, the recessed and protruding parts being disposed on the movable part and the fixing part; and
 a damper material provided to the rotation restricting part so as to make contact with the movable part and the fixing part.

One aspect of a camera module according to the present invention includes:
 the above-described optical-element driving device;
 the optical element; and
 an image capturing part configured to capture a subject image imaged by the optical element.

One aspect of a camera-mounted device according to the present invention is a camera-mounted device that is an information apparatus or a transporting apparatus, the camera-mounted device including:
 the above-described camera module; and
 an image processing part configured to process image information obtained by the camera module.

Advantageous Effects of Invention

According to the present invention, it is possible to suppress an impact caused at the time of restricting the rotation of a movable part without significantly complicating and enlarging a device.

DESCRIPTION OF EMBODIMENTS

Hereinafter, embodiments of the present invention will be described in detail with reference to the drawings.

Regarding Configuration of Camera-Mounted Device

To begin with, a camera-mounted device to which a camera module according to the present embodiment is applied will be described.

Figure 1A:
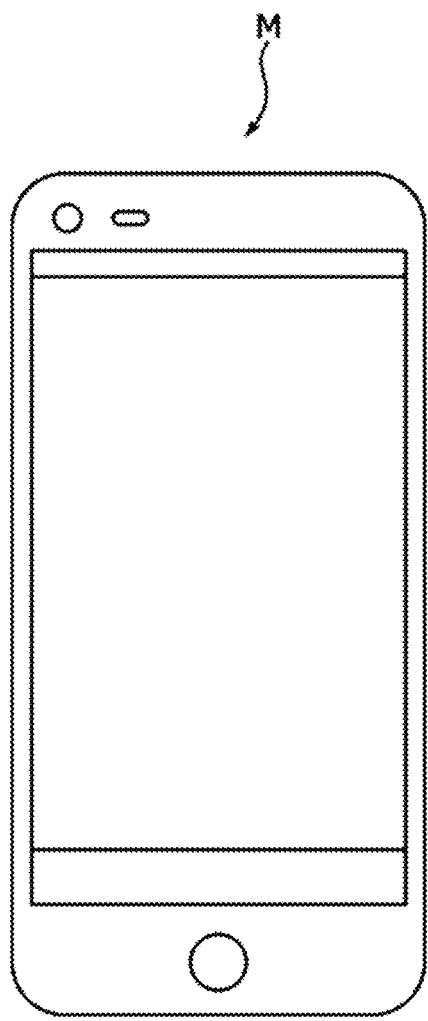
FIG. 1A is a front view of an example of a camera-mounted device on which a camera module according to an embodiment of the present invention is mounted.
Figure 1B:
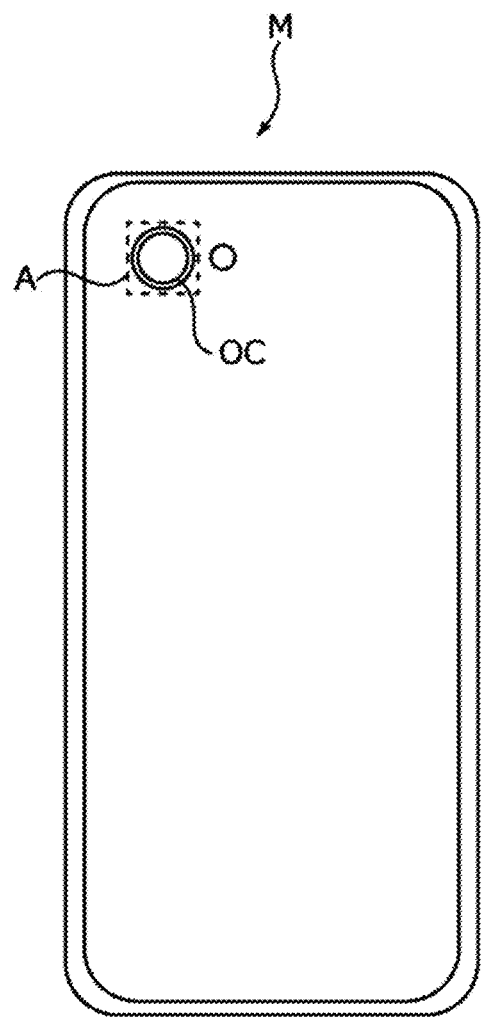
FIG. 1B is a rear view of an example of the camera-mounted device.

FIGS. 1A and 1B are diagrams illustrating smartphone M (an example of the camera-mounted device) equipped with camera module A according to the present embodiment. FIG. 1A is a front view of smartphone M and FIG. 1B is a rear view of smartphone M. Smartphone M includes one or more rear cameras OC, to which Camera module A is applied. Camera module A has an AF function and an OIS function, and can capture an image without image blurring by automatically performing focusing at the time of capturing a subject and by optically correcting shake (vibration) caused at the time of capturing the image.

Figure 2A:
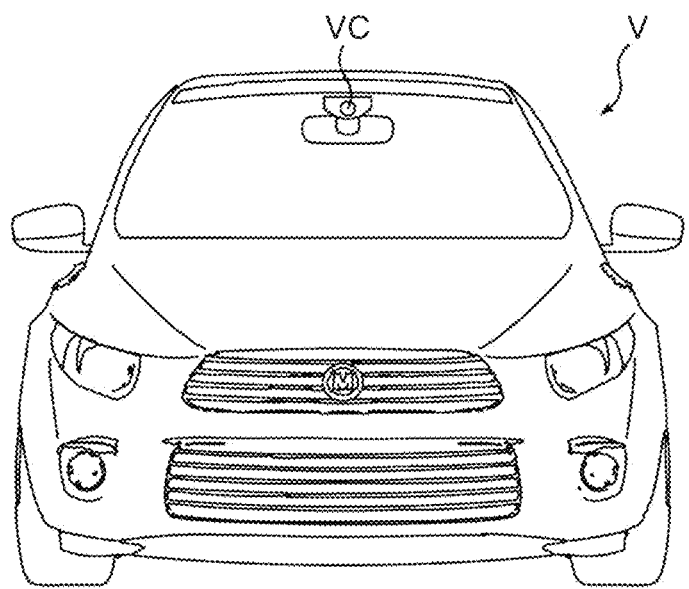
FIG. 2A is a front view of another example of the camera-mounted device on which the camera module according to the present embodiment is mounted.
Figure 2B:
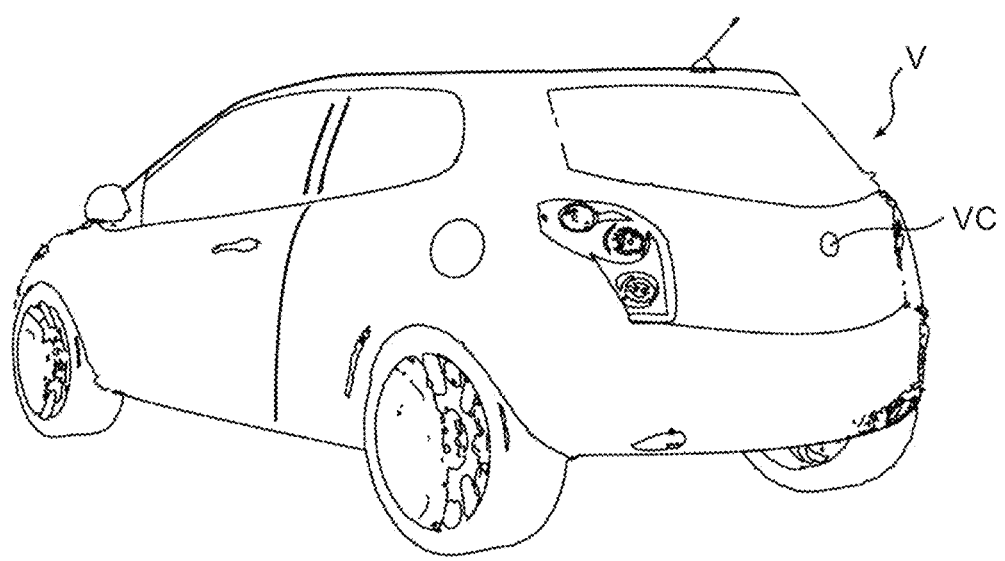
FIG. 2B is a perspective view of another example of the camera-mounted device.

FIGS. 2A and 2B are diagrams illustrating automobile V (another example of the camera-mounted device) in which in-vehicle camera module VC (Vehicle Camera) is mounted. FIG. 2A is a front view of automobile V and FIG. 2B is a rear perspective view of automobile V. As illustrated in FIGS. 2A and 2B, in-vehicle camera module VC may for example, be attached to the windshield so as to face forward, or to the rear gate so as to face backward. This in-vehicle camera module VC is used for rear-view monitoring, drive recording, collision avoidance control, automatic drive control, and the like. Camera module A is applied as in-vehicle camera module VC of automobile V.

Although the present embodiment is described with the example in which camera module A is applied to smartphone M, camera module A is applicable to various camera-mounted devices that include camera module A and also include an image processing part for processing image information captured by camera module A. For example, the camera-mounted device includes various information apparatuses and transportation apparatuses. Examples of the information apparatus include a camera-mounted mobile phone, a note-type personal computer, a tablet terminal, a mobile game machine, a web camera, a camera-mounted in-vehicle device (e.g., a rear-view monitor device or a drive recorder device), and a drone. Further, examples of the transporting devices include an automobile and a drone.

Regarding Configuration of Camera Module

Next, a schematic configuration of camera module A will be described. Note that, for the description of the present embodiment, an orthogonal coordinate system (X, Y, Z) is used. Note that, in the present embodiment, intermediate directions of the X and Y directions in the XY plane are described as U and V directions (see FIGS. 7 and 8). For example, the U and V directions are diagonal directions in the shape of camera module A seen in plan view, which has a square shape in the present embodiment. It is needless to say that the expressions related to shapes used in the description of the present embodiment are convenient expressions for a simple and schematic description and do not necessarily apply to the precise definition of a geometric figure.

Figure 3:
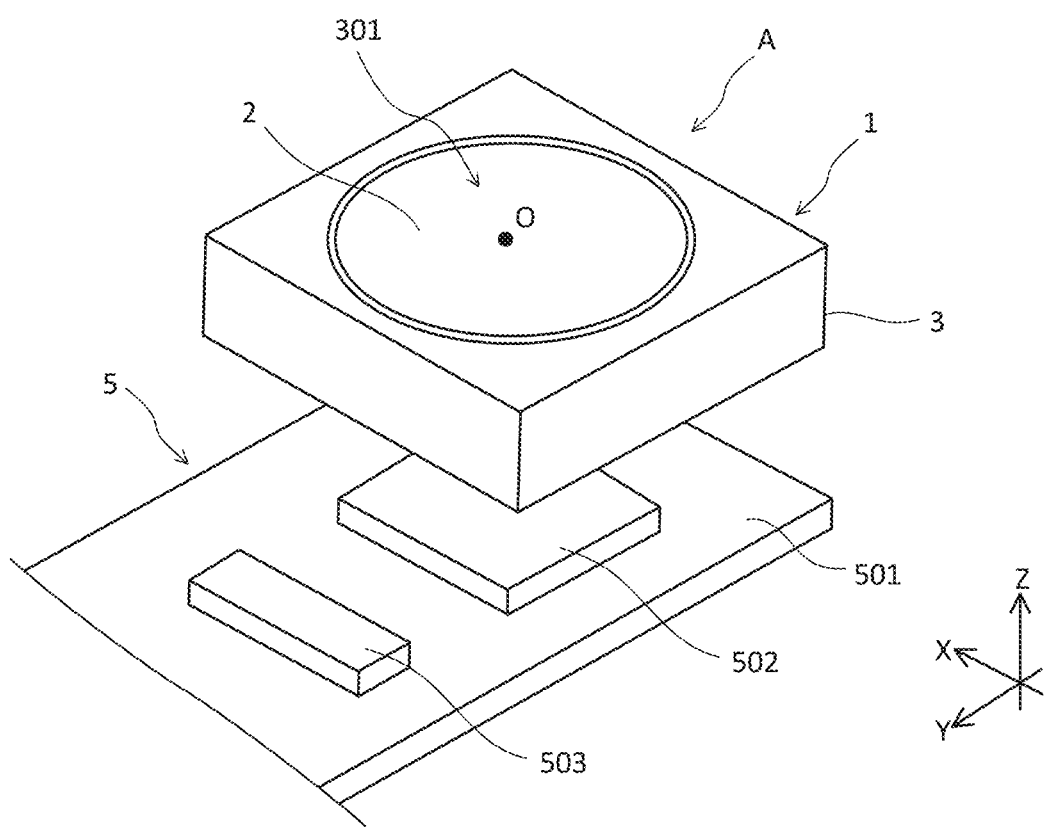
FIG. 3 is a perspective view of a schematic configuration of the camera module according to the present embodiment.

FIG. 3 is a perspective view schematically illustrating a configuration of camera module A. Camera module A is mounted such that the vertical direction (or horizontal direction) is the X-direction, the horizontal direction (or vertical direction) is the Y-direction, and the front-rear direction is the Z-direction, for example, during capturing an image with smartphone M. That is, the Z-direction is an optical-path direction, and the upper side (+Z side) in FIG. 3 is a light reception side (also referred to as "macro position side") in the optical-path direction and the lower side (−Z side) is an image formation side (also referred to as "infinity position side") in the optical-path direction. The direction orthogonal to the Z direction is the optical-path-orthogonal direction, and the X and Y directions are examples of the optical-path-orthogonal directions.

A path of light formed by opening portion 301 of cover 3 to be described later, lens-housing opening portion 110*a*1 housing lens part 2 in AF movable part 11 to be described later, or central opening portion 250 for image capturing element 502 in OIS fixing part 20 to be described later is an optical path (see FIG. 4). Then, the direction in which the optical path extends (the penetration direction of each opening portion) is the optical-path direction. The optical-path direction may also be referred to by another designation such as an optical-axis direction and a focus direction (a direction in which the focus is adjusted) depending on the type or the like of the optical element. The optical-path-orthogonal direction may be referred to as an optical-axis-orthogonal direction, a shake correction direction, or the like, and the XY plane may be referred to as an optical-axis-orthogonal plane, a shake correction plane, or the like.

Further, in the following description, unless otherwise specified, "radial direction" means a direction extending radially or centrifugally from the optical path or optical axis O as a center, and "circumferential direction" means a direction extending around the optical path or the optical axis. Furthermore, unless otherwise specified, "outer/outside" means an outer side in the radial direction away from the optical path or optical axis O as the center, and "inner/inside" means an inner side in the radial direction toward the optical path or optical axis O as the center.

Further, in the following description, four corners of the shape (here, a square in the present embodiment) of camera module A as seen in plan view may be distinguished from each other and specified. In this case, for convenience, a corner portion on the + side in the X-direction and the + side in the Y-direction is referred to as a first corner portion, a corner portion on the − side in the X-direction and the + side in the Y-direction is referred to as a second corner portion, a corner portion on the − side in the X-direction and the − side in the Y-direction is referred to as a third corner portion, and a corner portion on the + side in the X-direction and the − side in the Y-direction is referred to as a fourth corner portion.

As illustrated in FIG. 3, camera module A includes: optical-element driving device 1 that implements the AF function and the OIS function; lens part 2 (an example of the optical element) composed of a cylindrical lens barrel and a lens housed therein; and image capturing part 5 configured to capture a subject image imaged by lens part 2.

Optical-element driving device 1 is externally covered by cover 3. Cover 3 is a capped quadrangular tube having a substantially rectangular shape in plan view seen from above in the Z-direction. In the present embodiment, cover 3 as seen in plan view has a square shape. Cover 3 includes substantially circular opening portion 301 in an upper surface (a surface on the + side in the Z-direction). Lens part 2 faces the outside from opening portion 301 of cover 3. Cover 3 is fixed, for example, adhesively to base member 25 of OIS fixing part 20 of optical-element driving device 1. Cover 3 is made of, for example, a magnetic material, and functions as a shielding member that blocks electromagnetic waves from the outside of optical-element driving device 1 and prevents magnetic interaction between the inside and the outside of optical-element driving device 1.

Image capturing part 5 is disposed on the image formation side (the − side in the Z-direction) of optical-element driving device 1. Image capturing part 5 includes, for example, image sensor board 501, and image capturing element 502 and control part 503 mounted on image sensor board 501. Image capturing element 502 is composed of, for example, a Charge-Coupled Device (CCD) image sensor, a Complementary Metal Oxide Semiconductor (CMOS) image sensor, or the like, and captures a subject image imaged by lens part 2. Optical-element driving device 1 is mounted on image sensor board 501 and is electrically connected to image sensor board 501.

Control part 503 is composed of, for example, a control Integrated Circuit (IC), and performs a drive control of optical-element driving device 1. Control part 503 may be disposed on image sensor board 501, or may be disposed on a camera-mounted apparatus on which camera module A is mounted (smartphone M in the present embodiment).

Note that the present embodiment employs the configuration where lens part 2 is configured to be movable in optical-element driving device 1 in the optical-axis direction and the optical-axis-orthogonal direction with respect to image sensor board 501 whose position is fixed, but, for focusing or shake correction, lens part 2 may be fixed (immovable) in at least one of the optical-axis direction and/or the optical-axis-orthogonal direction, and image capturing element 502 may be movable. In this case, image capturing element 502 is an exemplary optical element held by the AF movable part or the OIS movable part.

Regarding Configuration of Optical-Element Driving Device

Figure 5:
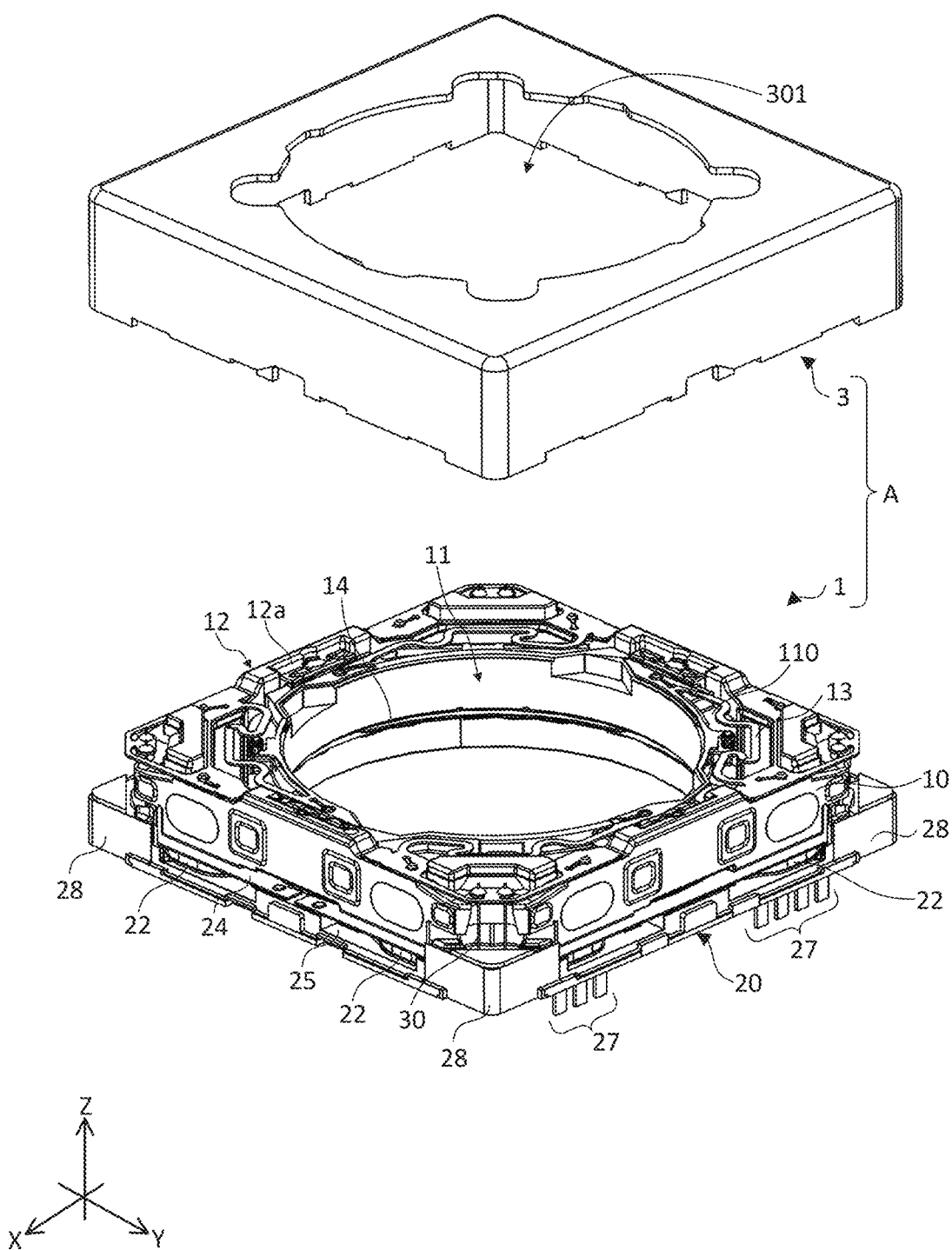
FIG. 5 is an upper exploded perspective view of the camera module according to the present embodiment in a state in which a cover is removed from the optical-element driving device.
Figure 6:
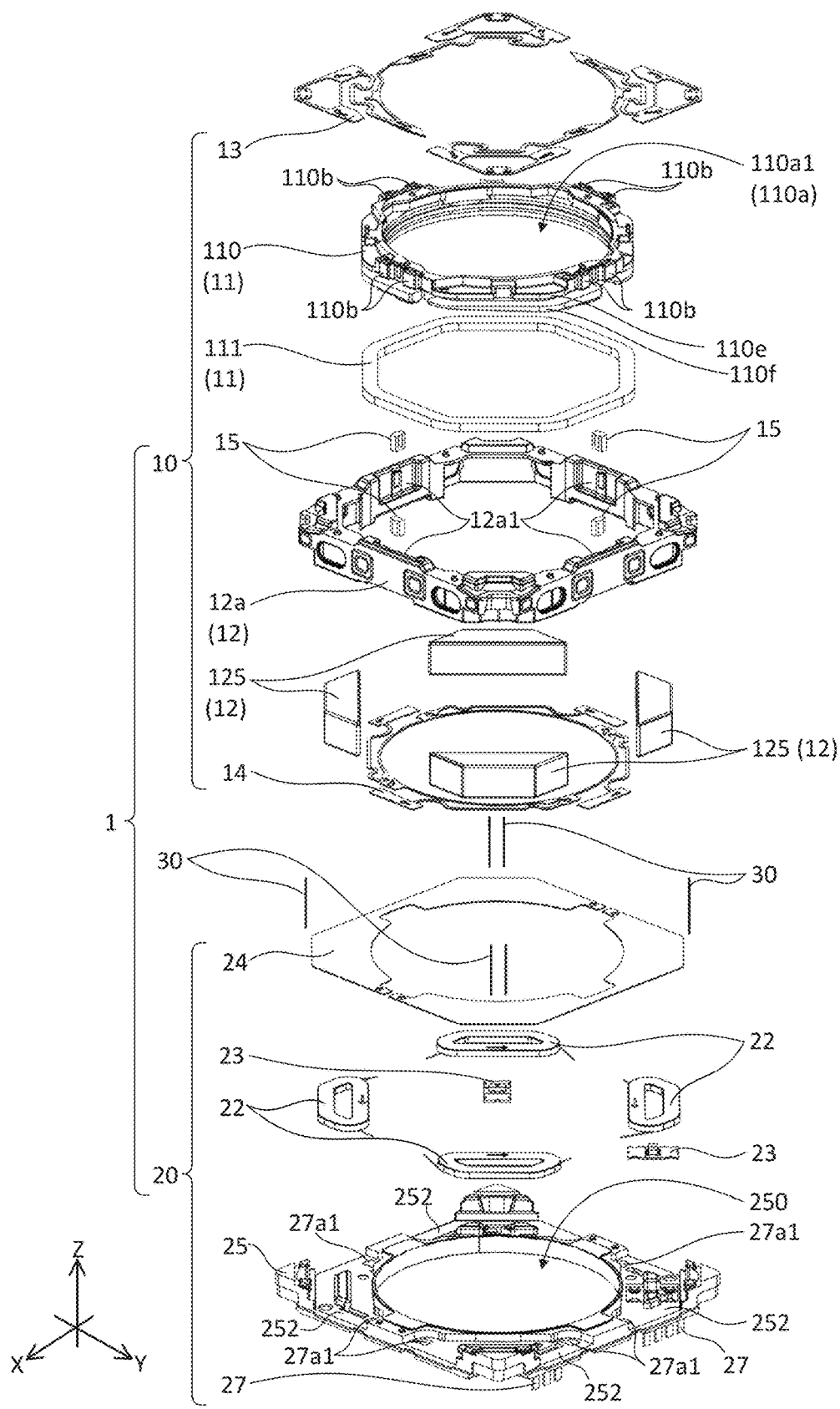
FIG. 6 is an exploded perspective view of an internal configuration of the optical-element driving device illustrated in FIG. 5.

Next, the configuration of optical-element driving device 1 will be described with reference to FIGS. 4 to 6. In the following description of the present embodiment, for the sake of convenience, the + side in the Z-direction is referred to by "upper" and the − side in the Z-direction is referred to by "lower."

Figure 4:
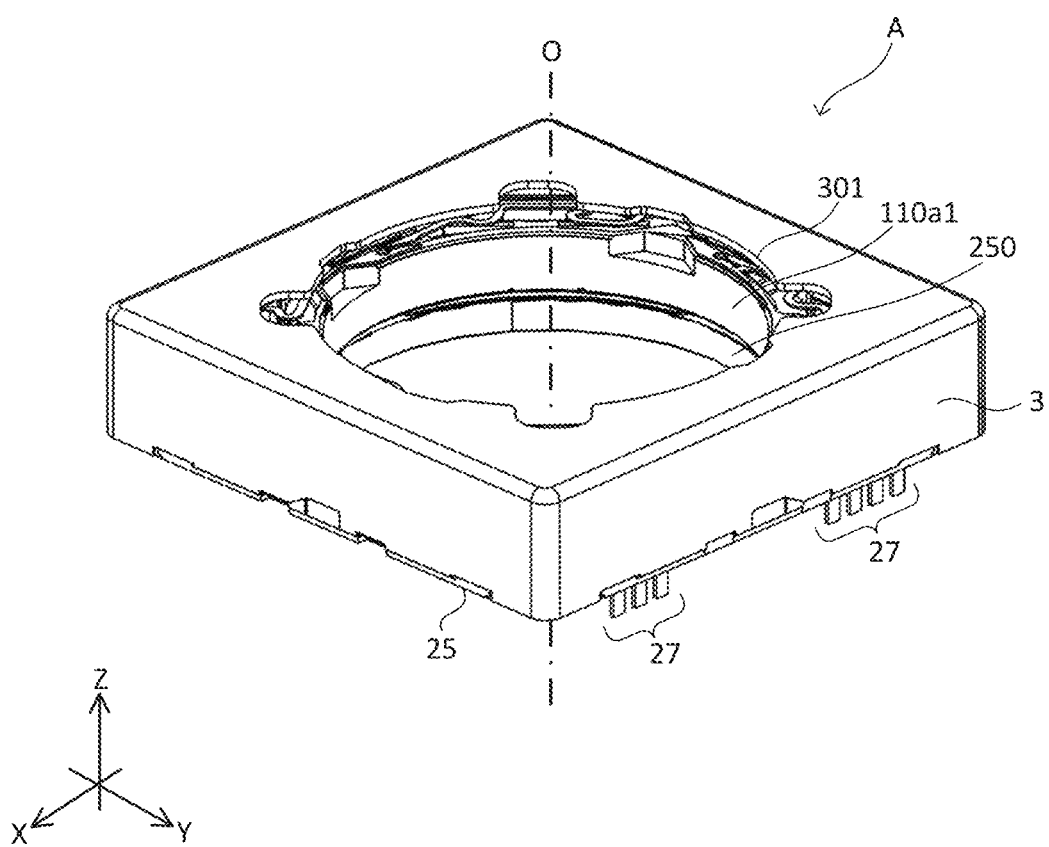
FIG. 4 is an external perspective view of the optical-element driving device of the camera module according to the present embodiment.

FIG. 4 is an external perspective view of optical-element driving device 1. FIG. 5 is an exploded perspective view seen from above in a state in which cover 3 is removed from optical-element driving device 1. FIG. 6 is an exploded perspective view illustrating an internal configuration of optical-element driving device 1.

Optical-element driving device 1 includes OIS movable part 10, OIS fixing part 20, and OIS supporting part 30.

OIS movable part 10 includes an OIS magnet part that forms a part of an OIS voice coil motor, which is an exemplary OIS driving part, and swings in an optical-axis-orthogonal plane during shake correction. OIS fixing part 20 is a part including an OIS coil part. That is, the OIS driving part of optical-element driving device 1 employs a moving magnet system. OIS movable part 10 is also an "AF unit" including an AF driving part.

OIS movable part 10 is disposed above OIS fixing part 20 so as to be spaced apart from OIS fixing part 20 on the + side in the Z-direction (the light reception side or the upper side in the optical-axis direction), and is coupled to OIS fixing part 20 by OIS supporting part 30.

Regarding OIS Supporting Part

OIS supporting part 30 is composed of a plurality of suspension wires extending along the Z-direction (hereinafter, referred to as "suspension wires 30" instead of "OIS supporting part 30"). In each suspension wire 30, one end (lower end) is fixed to OIS fixing part 20, and the other end (upper end) is fixed to OIS movable part 10 (specifically, upper elastic supporting part 13). OIS movable part 10 is supported by suspension wires 30 so as to be swingable in the optical-axis-orthogonal plane.

In the present embodiment, a pair of suspension wires 30 is disposed at each of the four corners. Such an arrangement makes it possible to support the OIS movable part of the same weight even when the spring constant per suspension wire is lower (in other words, when the flexibility is higher) than in the case where a single suspension wire is disposed at each of the four corners. It is thus possible to achieve both stable support performance and swing performance in shake correction. Further, since it becomes less likely for the stress to be concentrated on individual suspension wires 30, the durability can also be improved.

All suspension wires 30 disposed at the four corners are used as power supply paths to AF coil part 111, or suspension wires 30 disposed at the four corners are selectively used as power supply paths to AF coil part 111. Note that the number of suspension wires 30 is not limited to eight, and may be less or greater than eight as long as the performance of supporting OIS movable part 10 in a swingable manner is maintained. Further, the configuration of the OIS supporting part is not limited to a linear member such as a suspension wire, and the OIS supporting part may be configured to swingably support OIS movable part 10 by a frame made of a resin-based material such as an elastomer. Further, in the present embodiment, suspension wires 30 are members formed of a metal material for the purpose of power supply and signal transmission, but suspension wires 30 do not necessarily have to be formed of a metal material as long as a means for power supply and signal transmission is separately provided.

Regarding OIS Movable Part

OIS movable part 10 (also referred to as AF unit) includes AF movable part 11, AF fixing part 12, AF supporting parts (upper elastic supporting part 13 and lower elastic supporting part 14), and damper material 15.

Regarding AF Movable Part

AF movable part 11 is disposed radially inward with respect to AF fixing part 12 so as to be spaced apart from AF fixing part 12, and is coupled to AF fixing part 12 by upper elastic supporting part 13 and lower elastic supporting part 14.

AF movable part 11 includes a coil part that forms a part of a AF voice coil motor, which is an exemplary AF driving part, and is a part that moves in the Z-direction (optical-axis direction) with respect to AF fixing part 12 at the time of focusing. AF fixing part 12 includes a magnet part that forms a part of the AF voice coil motor. That is, the AF driving part of optical-element driving device 1 employs a moving coil system.

AF movable part 11 includes lens holder 110 and AF coil part 111. AF movable part 11 is an exemplary movable part in the present invention.

Lens holder 110 includes lens housing part 110a having a cylindrical shape. Lens part 2 is fixed to the inner peripheral surface of opening portion (lens-housing opening portion) 110a1 of lens housing part 110a, for example, adhesively. Note that a fixation method for fixing lens part 2 to lens holder 110 is not limited to adhesion, and may be another method.

Lens holder 110 is formed of, for example, a molded material made of polyarylate (PAR) or a PAR alloy that is a mixture of multiple resin materials containing PAR (e.g., PAR/PC). Thus, the weld strength of the lens holder is made higher than that of a conventional molded material, for example, a Liquid Crystal Polymer (LCP). Accordingly, the toughness and impact resistance of the lens holder can be secured even when lens holder 110 is thinned. Therefore, the external size of optical-element driving device 1 can be reduced, and the miniaturization and weight reduction can be achieved.

Lens holder 110 includes upper flange 110e and lower flange 110f that protrude outward in the radial direction respectively from upper and lower portions of the outer peripheral surface of lens housing part 110a, and upper flange 110e and lower flange 110f on outer peripheral surface 110d define therebetween a continuous groove over the entire circumference. That is, lens holder 110 has a bobbin structure. The groove formed on the entire circumference of outer peripheral surface 110d of lens holder 110 is AF-coil-housing groove part 110c in which AF coil part 111 is disposed (see FIGS. 12 and 13).

Lens holder 110 includes protruding parts that further protrude outward from upper flange 110e. The protruding parts function as rotation restricting parts that restrict lens holder 110 to rotating around the optical axis (circumferential direction). In the present embodiment, these protruding parts are rotation-restricting protruding parts 110b. The placement positions of the rotation restricting parts in the circumferential direction are positions different from the four corners where magnet disposing parts of magnet holder 12a to be described later are positioned, and more specifically, are positions corresponding to the centers of the four sides of magnet holder 12a. A detailed configuration of the rotation restricting part in the present embodiment will be described later.

AF coil part 111 is a coil that is energized at the time of focusing. Opposite ends of AF coil part 111 are tied to tying parts (not illustrated) disposed on lens holder 110.

As for details of the configuration of AF movable part 11, conventionally known techniques can be adopted as appropriate, and thus detailed description thereof will be omitted herein.

Regarding AF Fixing Part

AF fixing part 12 supports AF movable part 11 by AF supporting parts such that AF movable part 11 can move in the optical-axis direction. AF fixing part 12 includes magnet holder 12a and magnet parts 125. AF fixing part 12 is an exemplary fixing part in the present invention.

Magnet holder 12a has a square cylindrical shape that is square in plan view in the Z-direction, and, on the inner peripheral surface at portions corresponding to the four corners, includes magnet placement portions in which magnet parts 125 are placed. An inner cavity portion defined by inner peripheral surface 12a2 of magnet holder 12a (see FIGS. 11 and 13) and the inner surface of magnet parts 125 mounted in the magnet placement portions forms a lens-holder-housing opening portion for housing AF movable part 11.

At each of the four corners on the outer peripheral surface of magnet holder 12a, a groove recessed inward in the radial direction is formed, and suspension wires 30 are disposed in each of the grooves. In these grooves, damper materials (e.g., silicone gel) may be disposed, and the disposing of the damper materials can suppress generation of unwanted resonance (higher-order resonance mode) and stabilize the OIS operation.

In magnet holder 12a, lower elastic supporting part 14 is fixed to the end surface (back surface) on the − side in the Z-direction, and upper elastic supporting part 13 is fixed to the surface (front surface) on the + side in the Z-direction.

In the present embodiment, similarly to lens holder 110, magnet holder 12a is formed of, for example, a molding material made of polyarylate (PAR) or a PAR alloy that is a mixture of multiple resin materials containing PAR (e.g., PAR/PC). This increases the weld strength, and thus the toughness and impact resistance can be secured even when magnet holder 12a is thinned. Therefore, the external size of optical-element driving device 1 can be reduced, and the miniaturization and height reduction can be achieved.

Magnet parts 125 include four permanent magnets 125A to 125D having rectangular and columnar shapes (an example of the magnet). Permanent magnets 125A to 125D are fixed to the magnet placement portions, for example, adhesively. In the present embodiment, permanent magnets 125A to 125D each have the shape of substantially isosceles trapezoid in plan view.

Figure 7:
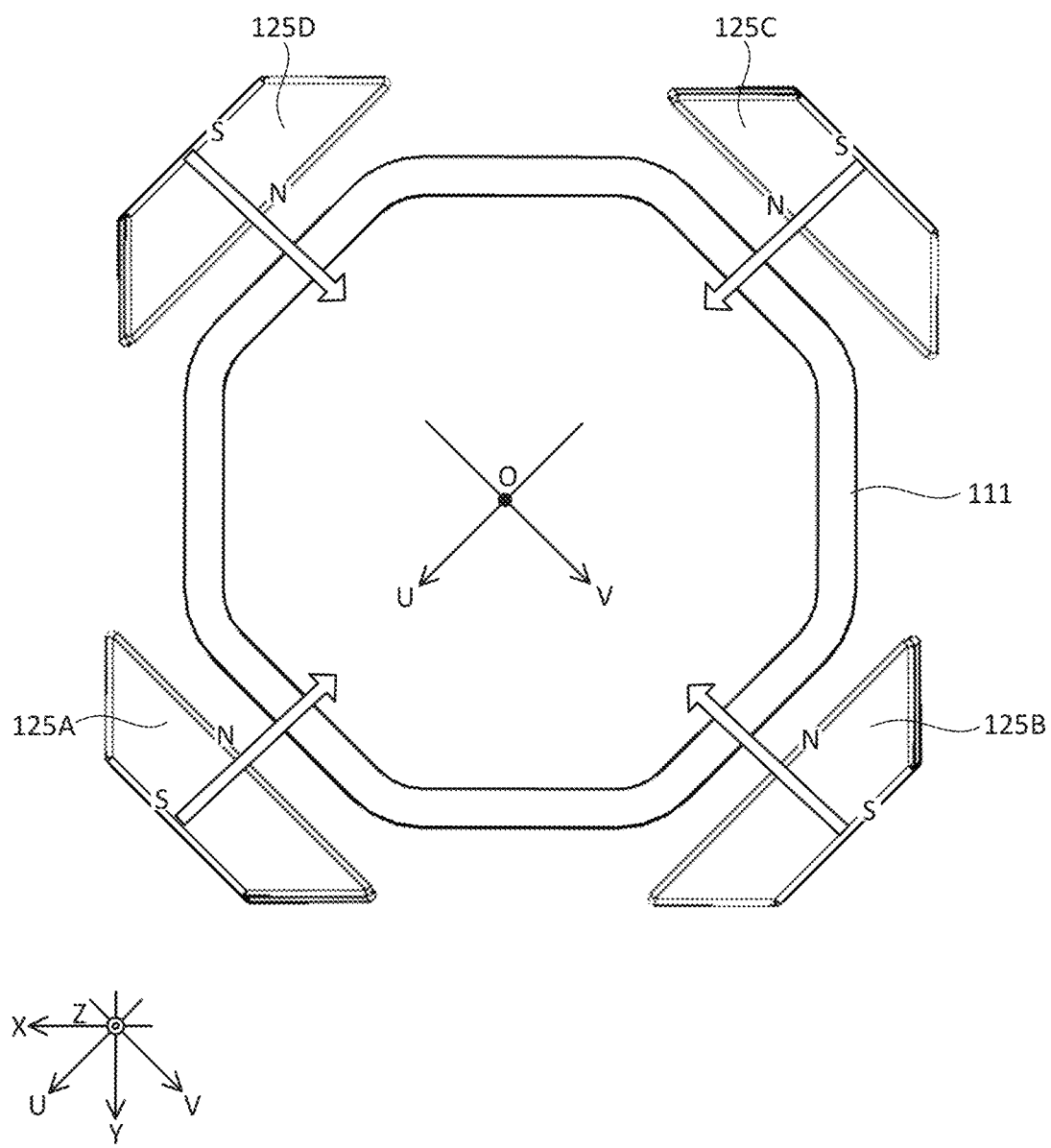
FIG. 7 is a diagram for describing a driving principle of an AF driving part in the optical-element driving device illustrated in FIG. 5.

Thus, spaces of the corner portions of magnet holder 12a (specifically, magnet placement portions) can be effectively used. Permanent magnets 125A to 125D are magnetized so as to form magnetic fields that traverse AF coil part 111 in the radial direction as illustrated in FIG. 7 and traverse OIS coil parts 22 (OIS coils 22A to 22D) in the optical-axis direction as understood from FIG. 8. In the present embodiment, permanent magnets 125A to 125D are magnetized such that the inner circumferential sides are the N pole, and the outer circumferential sides are the S pole.

The end surfaces (back surfaces) of permanent magnets 125A to 125D on the − side in the Z-direction protrude toward the − side in the Z-direction relative to magnet holder 12a. That is, the height of OIS movable part 10 is defined by permanent magnets 125A to 125D. Accordingly, the height of OIS movable part 10 is minimized depending on the sizes of permanent magnets 125A to 125D for securing the magnetic force, and thus the height of optical-element driving device 1 can be reduced.

Magnet parts 125 and AF coil part 111 as described above constitute the AF voice coil motor (AF driving part). Further, magnet parts 125 are used in both of an AF magnet part and the OIS magnet part.

Magnet holder 12a has recessed parts that are recessed outward in the radial direction, at the centers of the respective four sides. The recessed parts function as rotation restricting parts that restrict lens holder 110 to rotating around the optical axis. In the present embodiment, these recessed parts are rotation-restricting recessed parts 12a1. A detailed configuration of the rotation restricting part in the present embodiment will be described later.

As for details of the configuration of AF fixing part 12, conventionally known techniques can be adopted as appropriate, and thus detailed description thereof will be omitted herein.

Regarding AF Supporting Part

AF supporting parts elastically support AF movable part 11 with respect to AF fixing part 12. In the present embodiment, AF supporting part 13 includes upper elastic supporting part 13 and lower elastic supporting part 14. In the present embodiment, a case is exemplarily described where both upper elastic supporting part 13 and lower elastic supporting part 14 are leaf springs. Then, in the following description, the terms "upper elastic supporting part 13" and "lower elastic supporting part 14" are respectively referred to as "upper leaf spring 13" and "lower leaf spring 14." The leaf springs are made of, for example, beryllium copper, nickel copper, or stainless steel.

Upper leaf spring 13 is fixed, at the outer side, to the surface (front surface) of magnet holder 12a on the + side in the Z-direction, and fixed, at the inner side, to the surface (front surface) of lens holder 110 on the + side in the Z-direction. In upper leaf spring 13, arms extending in an intermediate portion between the outer side and the inner side have elastically deformable shapes, and the inner portion of upper leaf spring 13 is thus relatively displaceable in the Z-direction with respect to the outer portion of upper leaf spring 13.

Upper leaf spring 13 includes an outwardly extending portion that further extends outward relative to the outer portion fixed to the surface of magnet holder 12a. The outwardly extending portion is disposed on the + side in the Z-direction with respect to the groove where suspension wires 30 are disposed in magnet holder 12a. The outwardly extending portion is a wire fixing portion in which the upper end of suspension wires 30 are fixed by solder.

Upper leaf spring 13 is separated into a power supply path portion connected to suspension wires 30 that are used as power supply paths to an AF control part (not illustrated), and a signal path portion connected to suspension wires 30 that are used as signal paths for transmitting a control signal to the AF control part (not illustrated). Upper leaf spring 13 forming the power supply path portion is connected to AF coil part 111 by solder at the tying parts disposed on magnet holder 12a.

Lower leaf spring 14 is fixed, at the outer side, to the surface (back surface) of magnet holder 12a on the − side in the Z-direction, and is fixed, at the inner side, to the surface (back surface) of lens holder 110 on the − side in the Z-direction. In lower leaf spring 14, arms extending in an intermediate portion between the outer side and the inner side has elastically deformable shapes, and the inner portion of lower leaf spring 14 is relatively displaceable in the Z-direction with respect to the outer portion of lower leaf spring 14.

As for details of the configuration of the AF supporting part, conventionally known techniques can be adopted as appropriate, and thus detailed description thereof will be omitted herein.

Regarding OIS Fixing Part

OIS fixing part 20 supports OIS movable part 10 by suspension wires 30 such that OIS movable part 10 is swingable in the optical-axis-orthogonal direction. OIS fixing part 20 includes OIS coil parts 22, magnetic sensor part 23, protective member 24, base member 25, and interconnection member 27.

Regarding OIS Coil Part

OIS fixing part 20 includes OIS coil parts 22 at the respective four corners facing magnet parts 125 in the Z-direction (optical-axis direction). OIS coil parts 22 are coils that are energized during shake correction. OIS coil parts 22 include four OIS coils 22A to 22D respectively corresponding to permanent magnets 125A to 125D. OIS coils 22A to 22D are air-core coils in the present embodiment.

Figure 8:
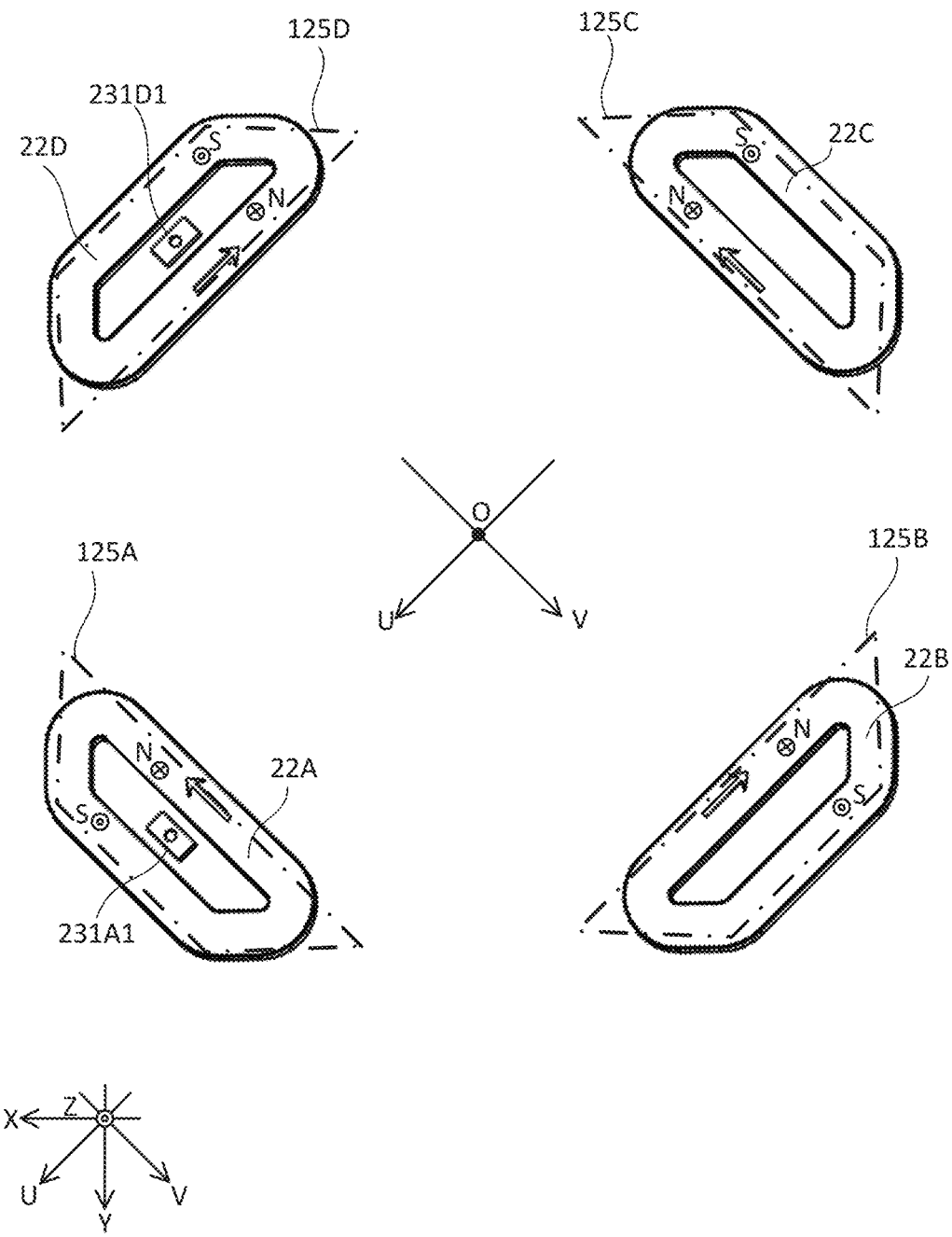
FIG. 8 is a diagram for describing a driving principle of an OIS driving part in the optical-element driving device illustrated in FIG. 5.

The sizes and placements of OIS coils 22A to 22D and permanent magnets 125A to 125D are set such that the magnetic fields radiated from the bottom surfaces of permanent magnets 125A to 125D traverse the respective long side portions of OIS coils 22A to 22D in the Z-direction (see FIG. 8). The combinations of magnet parts 125 and OIS coil parts 22 constitute an OIS voice coil motor (OIS driving part).

The end portions of lead wires provided to the opposite ends of each of OIS coils 22A to 22D are connected by solder to coil terminal elements 27a1 (an example of coil terminals) of interconnection member 27 disposed on base member 25. That is, in the present embodiment, OIS coils 22A to 22D are each directly connected to coil terminal elements 27a1 without any intervening board. Base member 25 is provided with coil recessed portions (examples of second recessed portions) 252 for disposing OIS coils 22A to 22D, and OIS coils 22A to 22D are respectively disposed on coil recessed portions 252 at the four corners.

Regarding Magnetic Sensor Part

OIS fixing part 20 includes, at the first and fourth corner portions of the four corners, magnetic sensor parts 23 within central cavities of corresponding OIS coils 22A and 22D. Each of magnetic sensor parts 23 detects the position of OIS movable part 10 in the optical-axis-orthogonal plane based on the relative position between permanent magnet 125A/125D and Hall element 231A1/231D1 in the optical-axis-orthogonal plane. The relative position is specified by using Hall element 231A1/231D1 to detect the magnetic field formed by magnet part 125 (permanent magnet 125A/125D). Each of magnetic sensor parts 23 includes a Hall element chip assembly. The Hall element chip assembly includes Hall element 231A1/231D1 (an example of the magnetic sensor) and a magnetic sensor board on which a chip of Hall element 231A1/231D1 is mounted. The magnetic sensor board is, for example, a Printed Wiring Board (PWB).

Hall elements 231A1 and 231D1 are disposed on central portions of the main surfaces of magnetic sensor boards 231A2 and 231D2, respectively, and, on each peripheral portion around the central portion, a board-side terminal part is disposed. The board-side terminal part is connected by solder to a board terminal element (not illustrated) of interconnection member 27 disposed on base member 25. That is, in the present embodiment, Hall elements 231A1 and 231D1 are each connected to the board terminal element via the magnetic sensor board. Base member 25 is provided with board recessed portions (an example of the first recessed portion) for disposing Hall element chip assemblies, and each Hall element chip assembly is disposed on each board recessed portion.

Regarding Base Member

Base member 25 as seen in plan view is a square member having central opening portion 250 through which the optical path or the optical axis passes. Base member 25 is made of a non-conductive material such as a synthetic resin, for example, a Liquid Crystal Polymer (LCP). Interconnection member 27 is insert-molded into base member 25.

Interconnection member 27 is a metallic plate-shaped member insert-molded into base member 25. Interconnection member 27 is made of a conductive material such as, e.g., beryllium copper, nickel copper, or stainless steel.

Interconnection member 27 includes a coil terminal member, a board terminal member, and a wire terminal member.

The coil terminal member includes coil terminal elements 27a1 and coil terminal connection portions. Coil terminal elements 27a1 are exposed upward at the bottom portions of coil recessed portions 252 provided to base member 25, and are directly connected by solder to the lead wires of OIS coils 22A to 22D disposed on coil recessed portions 252. The coil terminal connection portions protrude from an outer edge of base member 25 and is connectable to external image sensor board 501. In the coil terminal member, portions other than portions exposed or protruding from base member 25 are embedded in base member 25.

The board terminal member includes board terminal elements and board terminal connection portions. The board terminal elements are exposed upward at the bottom portions of the board recessed portions provided to base member 25, and are directly connected by solder to the board-side terminal parts of the Hall element chip assemblies disposed on the board recessed portions. The board terminal connection portions protrude from the outer edge of base member 25 and are connectable to external image sensor board 501. In the board terminal member, portions other than portions exposed or protruding from base member 25 are embedded in base member 25.

The wire terminal member includes wire terminal elements and wire terminal connection portions. The wire terminal elements are disposed so as to be exposed upward and downward at the four corners of base member 25, and are directly connected by solder to the lower ends of suspension wires 30 inserted through insertion holes formed in the wire terminal elements. The wire terminal connection portions protrude from the outer edge of base member 25 and are connectable to external image sensor board 501. In the wire terminal member, portions other than portions exposed or protruding from base member 25 are embedded in base member 25. Note that, in the wire terminal member, the portions exposed or protruding from base member 25 are exposed to the outside during assembly of optical-element driving device 1, but it is preferred that these portions be covered with sealing material 28 or the like (see FIG. 5) made of a resin after completion.

Regarding Protective Member

Protective member 24 is disposed so as to cover a region surrounding central opening portion 250 in base member 25. Protective member 24 is a thin plate member or a film member made of a non-conductive material such as a resin material. Protective member 24 completely covers placement regions of OIS coils 22A to 22D. Thus, protective member 24 is interposed between OIS coils 22A to 22D and permanent magnets 125A to 125D in the Z-direction. This can prevent OIS coils 22A to 22D and permanent magnets 125A to 125D from colliding with each other due to an external impact. Further, it is also possible to prevent short-circuiting caused when lower leaf spring 14, which is made of metal, makes contact with OIS coils 22A to 22D, which are also made of metal.

Regarding Detailed Configuration

Although other detailed configurations of OIS fixing part 20 will not be described herein, conventionally known techniques can be adopted as appropriate.

Regarding Operation of Optical-Element Driving Device

The focusing operation and the shake correction operation of the optical-element driving device will be herein described. FIGS. 7 and 8 are diagrams for respectively describing driving principles of the AF driving part (AF voice coil motor) and the OIS driving part (OIS void coil motor) in optical-element driving device 1.

When optical-element driving device 1 performs autofocusing, AF coil part 111 is energized. When AF coil part 111 is energized, a Lorentz force is generated in AF coil part 111 by the interaction between the magnetic fields of magnet parts 125 and the current flowing through AF coil part 111 (Fleming's left-hand rule). The direction of the Lorentz force in this case is a direction orthogonal to the direction of the magnetic field (direction toward the radially inner side, see FIG. 7) and the direction of the current flowing through AF coil part 111 (circumferential direction, see FIG. 7) (i.e., Z-direction (optical-axis direction)). Magnet parts 125 (permanent magnet 125A to 125D) are fixed, so that a reaction force acts on AF coil part 111. This reaction force serves as a driving force of the AF voice coil motor (AF driving part), and AF movable part 11 including AF coil part 111 moves in the Z-direction (optical-axis direction) to perform focusing.

When optical-element driving device 1 corrects the shake, OIS coils 22A to 22D are energized. When OIS coils 22A to 22D are energized, a Lorentz force is generated in OIS coils 22A to 22D by the interaction between the magnetic fields of magnet parts 125 and the currents flowing through OIS coils 22A to 22D (Fleming's left-hand rule). The direction of the Lorentz force in this case is a direction orthogonal to the directions of the magnetic fields (Z-direction (optical-axis direction), see FIG. 8) and the direction of the current (U or V direction, see FIG. 8) in the long-side portions of OIS coils 22A to 22D (i.e., V or U direction). OIS coils 22A to 22D are fixed, so that a reaction force acts on permanent magnets 125A to 125D. This reaction force serves as a driving force of the OIS voice coil motor (OIS driving part), and OIS movable part 10 including magnet parts 125 swings in the optical-axis-orthogonal plane to perform shake correction.

Regarding Rotation Restricting Part

Figure 9:
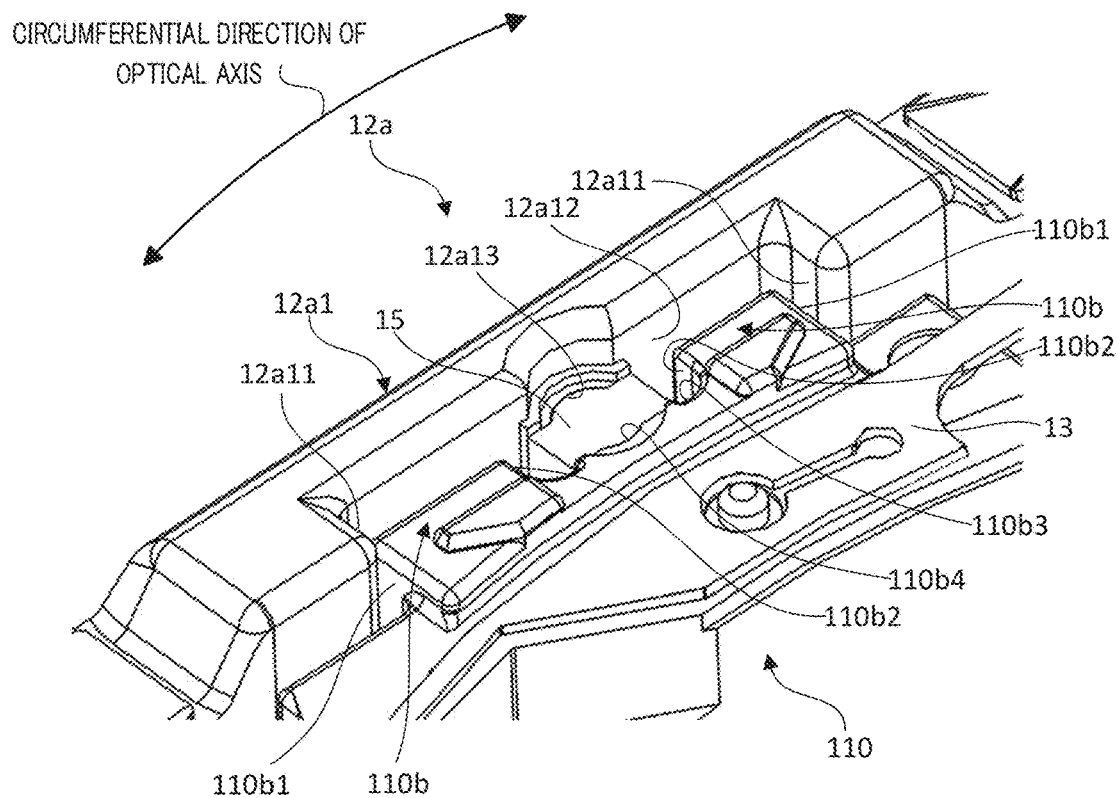
FIG. 9 is an enlarged perspective view of a configuration of a rotation restricting part in the optical-element driving device illustrated in FIG. 5.
Figure 10:
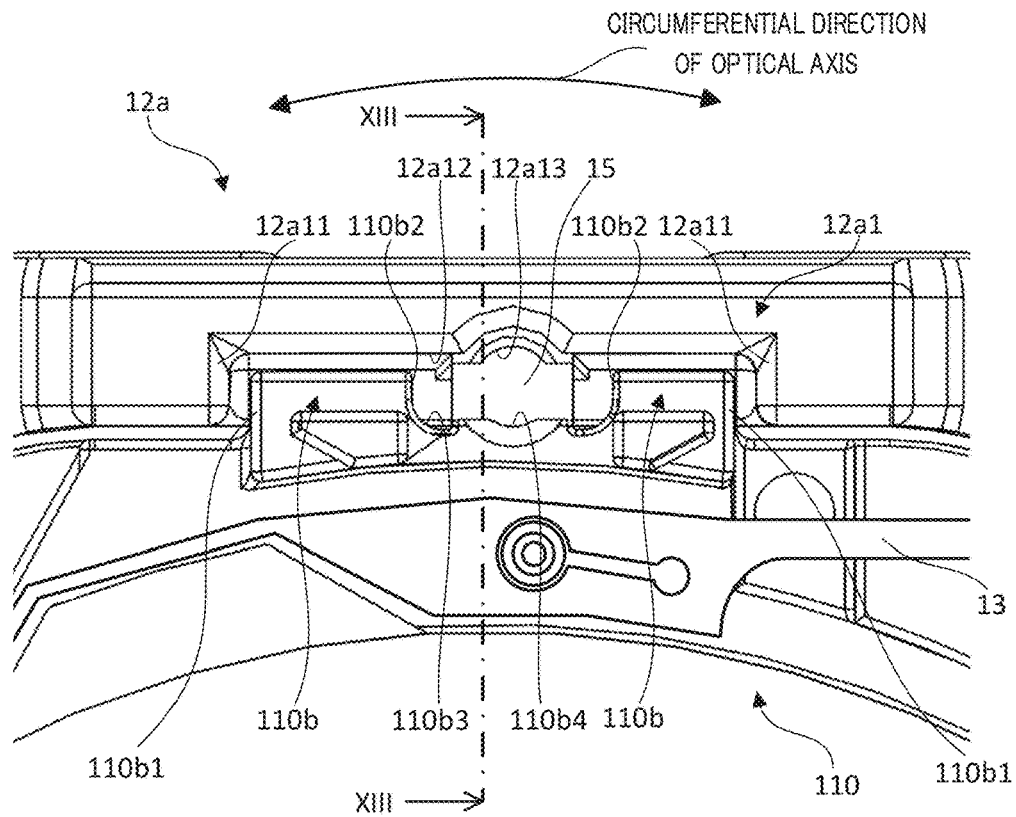
FIG. 10 is a plan view of the configuration of the rotation restricting part in the optical-element driving device illustrated in FIG. 5.
Figure 11:
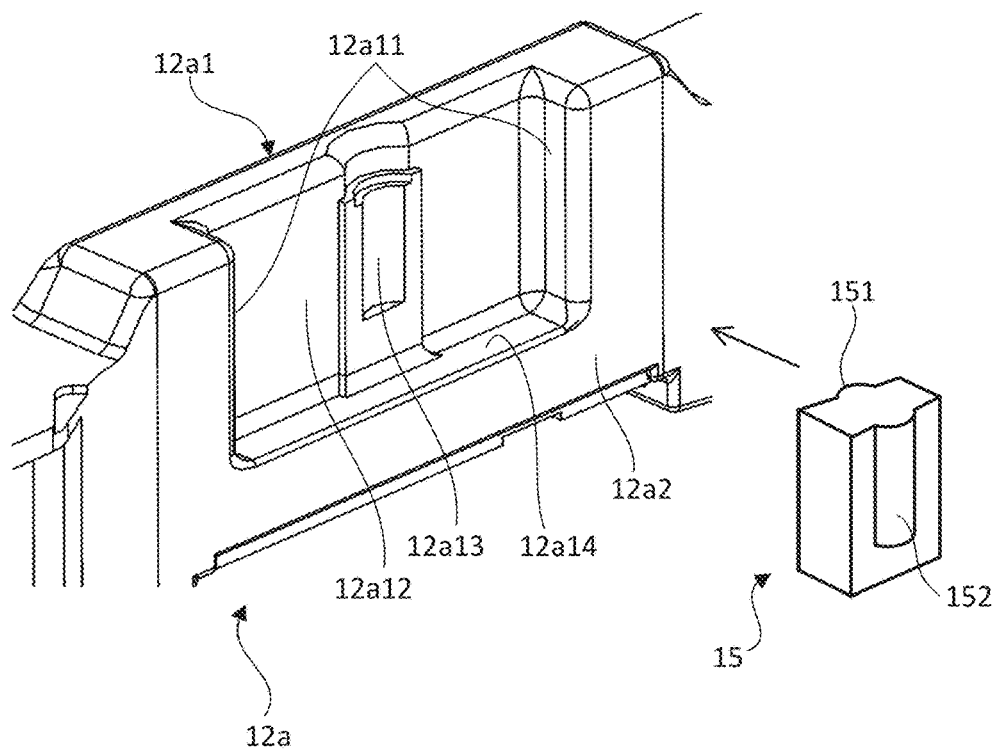
FIG. 11 is a perspective view of a configuration of a rotation-restricting recessed part in the rotation restricting part illustrated in FIGS. 9 and 10.
Figure 12:
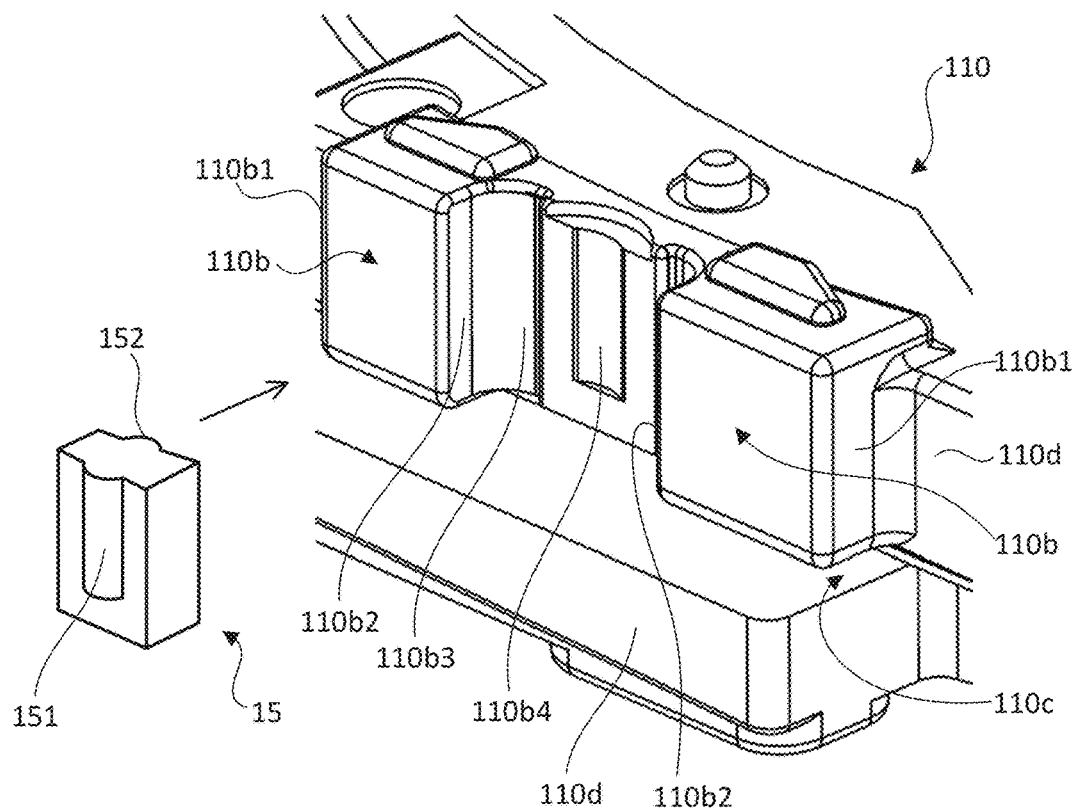
FIG. 12 is a perspective view of a configuration of a rotation-restricting protruding part in the rotation restricting part illustrated in FIGS. 9 and 10.
Figure 13:
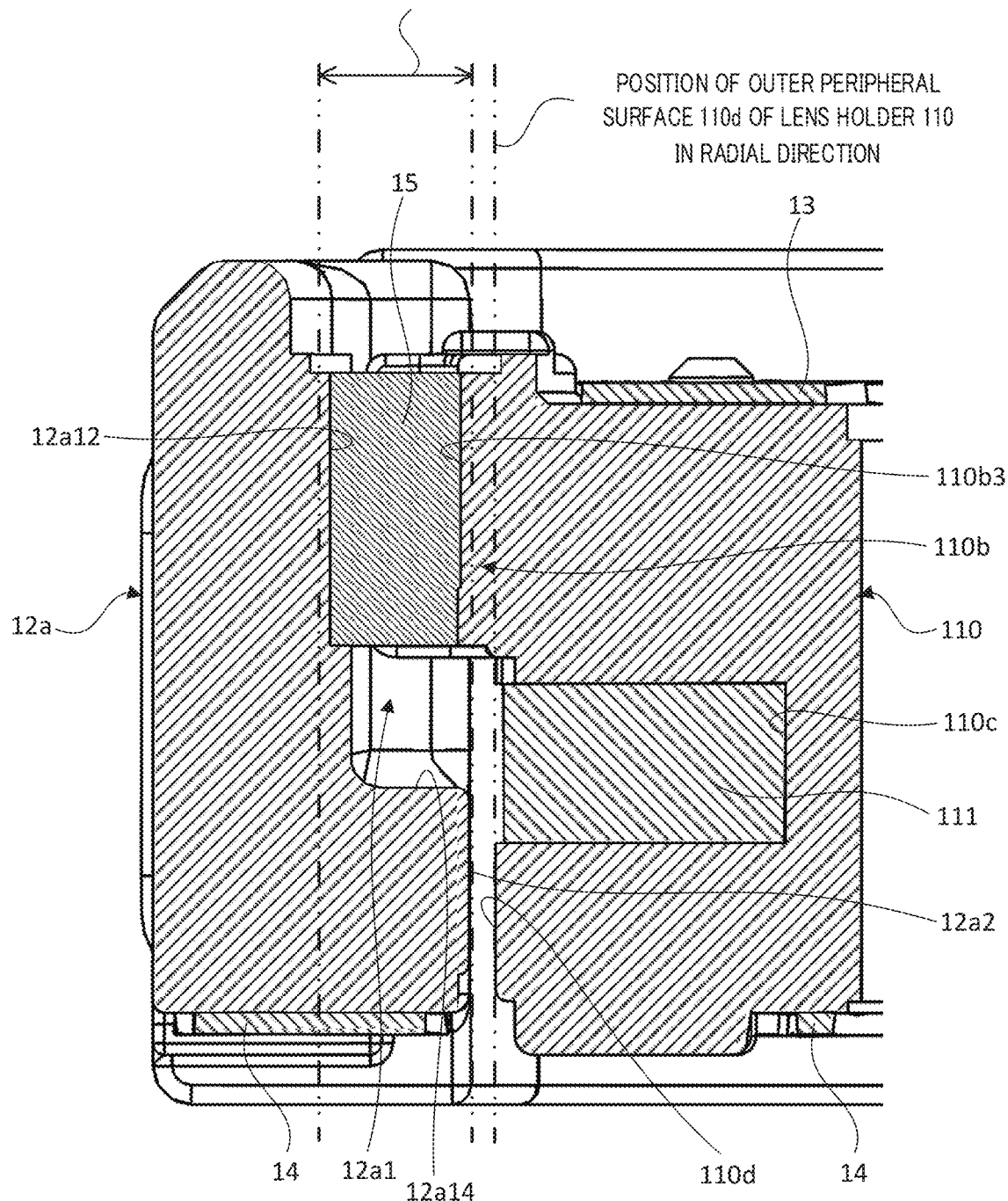
FIG. 13 is a cross-sectional view of the rotation restricting part illustrated in FIGS. 9 and 10 taken along line XIII-XIII in FIG. 10.

Next, the configuration of the rotation restricting part in optical-element driving device 1 will be described. FIGS. 9 and 10 are respectively an enlarged perspective view and a plan view of the configuration of a rotation restricting part in optical-element driving device 1. FIG. 11 is a perspective view of a configuration of rotation-restricting recessed part 12a1, and FIG. 12 is a perspective view of rotation-restricting protruding part 110b. FIG. 13 is a cross-sectional view of the rotation restricting part taken along line XIII-XIII in FIG. 10.

The rotation restricting part functions to restrict lens holder 110, which is AF movable part 11, to rotating around the optical axis with respect to magnet holder 12a, which is AF fixing part 12. Specifically, the rotation restricting part includes: rotation-restricting recessed part 12a1 on the inner peripheral side of magnet holder 12a; and a pair of rotation-restricting protruding parts 110b on the outer peripheral side of lens holder 110. Rotation-restricting recessed part 12a1 and a pair of rotation-restricting protruding part 110b are disposed at each of four positions (central part of the four sides) in the circumferential direction of the optical axis.

Rotation-restricting recessed part 12a1 is a C-shaped recessed part seen in a plan view, and is open to the inner side in the radial direction. Specifically, rotation-restricting recessed part 12a1 includes: a pair of side walls 12a11 spaced apart from each other at opposite ends in the circumferential direction of the optical axis; intermediate wall 12a12 extending while connecting the pair of side walls 12a11; damper-material receiving part 12a13 recessed outward in the radial direction from the central portion of intermediate wall 12a12; and lower wall 12a14 extending inward in the radial direction from the end portion of intermediate wall 12a12 in the optical-axis direction.

The pair of rotation-restricting protruding parts 110b is provided side-by-side in the circumferential direction of the optical axis at a position facing rotation-restricting recessed part 12a1, and protrudes outward in the radial direction from outer peripheral surface 110d of lens holder 110. Their respective ends are housed in rotation-restricting recessed part 12a1.

Each of the pair of rotation-restricting protruding parts 110b includes: contact side wall 110b1 facing side wall 12a11 of rotation-restricting recessed part 12a1 in the circumferential direction of the optical axis; and non-contact side wall 110b2 located on the opposite side to contact side wall 110b1. Non-contact side walls 110b2 of rotation-restricting protruding parts 110b face each other in the circumferential direction of the optical axis. Intermediate wall 110b3 extending while connecting the pair of non-contact side walls 110b2 is provided with damper-material receiving part 110b4 recessed inward in the radial direction from the central portion of intermediate wall 110b3.

The rotation restricting part restricts the rotation of lens holder 110 around the optical axis with respect to magnet holder 12a by bringing side wall 12a11 of rotation-restricting recessed part 12a1 in magnet holder 12a and contact side wall 110b1 of rotation-restricting protruding part 110b in lens holder 110 into contact with each other. That is, the rotation restricting part restricts the rotation of AF movable part 11 in the circumferential direction by bringing the recessed and protruding parts disposed on AF movable part 11 and AF fixing part 12 into contact with each other.

In such a configuration of the rotation restricting part, it is desired to suppress an impact that may be caused at the time of contact, as mentioned above. The present embodiment achieves suppression of the impact by providing a pair of rotation-restricting protruding parts 110b to lens holder 110 corresponding to each of rotation-restricting recessed parts 12a1, spacing the pair of rotation-restricting protruding parts 110b from each other in the circumferential direction of the optical axis, and disposing, between the pair of rotation-restricting protruding parts 110b, damper material 15 capable of absorbing the impact that may be caused at the time of contact.

Damper material 15 is a member made of, for example, a gel-like resin material having viscosity. Damper material 15 is disposed so as to be interposed between intermediate wall 110b3 on the side of lens holder 110 and intermediate wall 12a12 on the side of magnet holder 12a. Intermediate wall 110b3 and intermediate wall 12a12 face each other in the radial direction at a position between the pair of rotation-restricting protruding parts 110b. Lens holder 110 and magnet holder 12a are bridged by damper material 15 at such a position near the contact part of lens holder 110 and magnet holder 12a, and thus, the impact at the time of contact is effectively suppressed.

Intermediate wall 12a12 on the side of magnet holder 12a and intermediate wall 110b3 on the side of lens holder 110 are respectively provided with damper-material receiving parts 12a13 and 110b4 recessed outward and inward in the radial direction. Damper-material receiving parts 12a13 and 110b4 form a space for housing a part of the volume of damper material 15, specifically, intermediate parts 151 and 152. Further, damper-material receiving parts 12a13 and 110b4 are open to the above on the upper side, but have bottoms on the lower side. Thus, a part of damper material 15 injected between magnet holder 12a and lens holder 110 remains on damper-material receiving parts 12a13 and 110b4. This makes damper material 15 having a certain degree of fluidity to be easily held while being interposed between intermediate wall 12a12 and 110b3. That is, damper-material receiving parts 12a13 and 110b4 function to hold damper material 15 interposed between intermediate wall 12a12 and 110b3. Accordingly, the bridged state of magnet holder 12a and lens holder 110 by damper material 15 and the performance of absorbing the impact that may be caused at the rotation restricting part can be stably maintained.

As illustrated in FIG. 13, in lens holder 110, intermediate wall 110b3 between the pair of rotation-restricting protruding parts 110b extends outward relative to outer peripheral surface 110d of lens holder 110 in the radial direction. Further, in magnet holder 12a, lower wall 12a14 of rotation-restricting recessed part 12a1 extends inward relative to intermediate wall 110b3 of lens holder 110 in the radial direction. Thus, the radial position of the entire damper material 15 falls within the maximum depth range of rotation-restricting recessed part 12a1 of magnet holder 12a (from intermediate wall 12a12 of rotation-restricting recessed part 12a1 (or damper-material receiving part 12a13) to inner peripheral surface 12a2 of magnet holder 12a). That is, the entire volume of damper material 15 is housed within rotation-restricting recessed part 12a1. Then, lower wall 12a14 of rotation-restricting recessed part 12a1, which is spaced apart to the lower side from the pair of rotation-restricting protruding parts 110b and intermediate wall 110b3 extending between the pair of rotation-restricting protruding parts 110b, covers the entire lower side of damper material 15. These configurations can prevent damper material 15 from leaking out from rotation-restricting recessed part 12a1 and adhering to a component outside the AF unit.

As described above, according to the present embodiment, optical-element driving device 1 moves AF movable part 11 capable of holding lens part 2, with respect to AF fixing part 12 in the optical-axis direction. Optical-element driving device 1 includes: a rotation restricting part that restricts the rotation of AF movable part 11 in the circumferential direction of the optical axis by bringing the recessed and protruding parts disposed on AF movable part 11 and AF fixing part 12 into contact with each other; and damper material 15 provided to the rotation restricting part so as to make contact with AF movable part 11 and AF fixing part 12. This makes it possible, by damper material 15, to suppress the impact caused at the recessed and protruding parts of the rotation restricting part at the time of contact. Further, the suppression of the impact can be easily realized by providing damper material 15 to the rotation restricting part, and thus the configuration of optical-element driving device 1 is not significantly complicated or increased in size.

Furthermore, according to the present embodiment, damper material 15 is provided to the recessed and protruding parts of the rotation restricting part. Because the impact at the time of rotation restriction performed on the rotation restricting part is caused by the recessed and protruding parts, proving damper material 15 to the recessed and protruding parts can shorten the distance between the contact part and damper material 15, and thus the impact suppression effect can be further reliably realized.

Moreover, according to the present embodiment, the rotation restricting part includes: rotation-restricting recessed part 12*a*1 provided to AF fixing part 12 surrounding the outer side of AF movable part 11 in the radial direction; and a pair of rotation-restricting protruding part 110*b* provided to AF movable part 11 so as to be arranged side-by-side in the circumferential direction of the optical axis and protruding toward the inside of rotation-restricting recessed part 12*a*1 in the radial direction, and damper material 15 is provided between the pair of rotation-restricting protruding part 110*b*. As described above, providing a pair of rotation-restricting protruding parts 110*b* allows a space for disposing damper material 15 between the pair of rotation-restricting protruding parts 110*b*, and thus the space of the rotation restricting part can be used without waste.

Although the embodiment of the present invention has been described in detail, the present invention is not limited to the specific embodiment described above. Various changes and modifications can be made to the specific examples described in the above embodiment within the scope of the gist of the present invention described in the claims. For example, in the present embodiment, optical-element driving device 1 with a configuration including an AF function and an OIS function has been exemplarily described, but optical element driving device 1 may have a configuration including only the AF function without the OIS function.

INDUSTRIAL APPLICABILITY

The optical-element driving device and the camera module according to the present invention is useful for example, by being mounted on a camera-mounted device such as a smartphone, a mobile phone, a digital camera, a note-type personal computer, a tablet terminal, a mobile game machine, an in-vehicle camera, and a drone.

REFERENCE SIGNS LIST

A Camera module
M Smartphone
O Optical axis
OC Rear camera
V Automobile
VC In-vehicle camera
1 Optical-element driving device
2 Lens part
3 Cover
301 Opening portion
5 Image capturing part
501 Image sensor board
502 Image capturing element
503 Control part
10 OIS movable part
11 AF movable part (movable part)
110 Lens holder
110*a* Lens housing part
110*a*1 Lens-housing opening portion
110*b* Rotation-restricting protruding part (rotation restricting part, recessed and protruding part, protruding part)
110*b*1 Contact side wall
110*b*2 Non-contact side wall
110*b*3 Intermediate wall
110*b*4 Damper-material receiving part
110*c* AF-coil-housing groove part
110*d* Outer peripheral surface
110*e* Upper flange
110*f* Lower flange
111 AF coil part
12 AF fixing part (fixing part)
12*a* Magnet holder
12*a*1 Rotation-restricting recessed part (rotation restricting part, recessed and protruding part, recessed part)
12*a*11 Side wall
12*a*12 Intermediate wall
12*a*13 Damper-material receiving part
12*a*14 Lower wall
12*a*2 Inner peripheral surface
125 Magnet part
125A, 125B, 125C, 125D Permanent magnet
13 Upper elastic supporting part
14 Lower elastic supporting part
15 Damper material
151, 152 Intermediate part
20 OIS fixing part
22 OIS coil part
22A, 22B, 22C, 22D OIS coil
23 Magnetic sensor part
231A1, 231D1 Hall element
24 Protective member
25 Base member
250 Central opening portion
252 Coil recessed portion
27 Interconnection member
27*a*1 Coil terminal element
28 Sealing material
30 OIS supporting part

The invention claimed is:

1. An optical-element driving device that moves a movable part configured to hold an optical element, with respect to a fixing part in an optical-axis direction, the fixing part being disposed so as to surround an outer side of the movable part in a radial direction, the optical-element driving device comprising:
   a rotation restricting part including a recessed part provided to the fixing part and a pair of protruding parts provided side-by-side in a circumferential direction to the movable part and protruding in the radial direction toward an inside of the recessed part, the rotation restricting part being configured to restrict rotation of the movable part in the circumferential direction by bringing the recessed part and the pair of protruding parts into contact with each other; and
   a damper material provided to the rotation restricting part between the pair of protruding parts so as to make contact with the movable part and the fixing part.

2. The optical-element driving device according to claim 1, wherein
   an intermediate wall of the movable part and an intermediate wall of the fixing part each include a damper material receiving part for holding the damper material, the intermediate wall of the movable part and the intermediate wall of the fixing part facing each other in the radial direction and interposing the damper material at a position between the pair of protruding parts.

3. The optical-element driving device according to claim 2, wherein:
the intermediate wall of the movable part extends outward relative to an outer peripheral surface of the movable part in the radial direction, and
a lower wall of the fixing part extending inward in the radial direction from the intermediate wall of the fixing part extends inward relative to a wall surface of the movable part in the radial direction at a position spaced apart from the intermediate wall of the movable part in the optical-axis direction.

4. A camera module, comprising:
the optical-element driving device according to claim 1;
the optical element; and
an image capturing part configured to capture a subject image imaged by the optical element.

5. A camera-mounted device that is an information apparatus or a transporting apparatus, the camera-mounted device comprising:
the camera module according to claim 4; and
an image processing part configured to process image information obtained by the camera module.

* * * * *